United States Patent Office 3,781,389
Patented Dec. 25, 1973

3,781,389
PROCESS FOR THE PRODUCTION OF SUBSTITUTED THIONOPHOSPHORYL CHLORIDES
Peter Beutel, Mannheim, and Karl-Heinz Koenig, Frankenthal, Germany, assignors to Badische Anilin- & Soda-Fabrik Aktiengesellschaft, Ludwigshafen (Rhine), Germany
No Drawing. Filed June 21, 1971, Ser. No. 155,229
Claims priority, application Germany, July 21, 1970, P 20 36 048.9
Int. Cl. C07f 9/20
U.S. Cl. 260—986                                              11 Claims

ABSTRACT OF THE DISCLOSURE

A process for the production of substituted thionophosphoryl chlorides by reaction of thionophosphoric acids with phosgene.

---

The invention relates to a new process for the production of substituted thionophosphoryl chlorides which, as intermediates, are of particular interest for commercial phosphoric ester insecticides.

Several processes are known for producing O,O-disubstituted thionophosphoryl halides, e.g., O,O-dialkylthionophosphoryl chlorides are obtained by reacting the appropriate O,O-dialkylthionophosphoric acids, or their salts, with chlorine (DAS 1,211,170) or agents donating chlorine (British Pat. 656,303, German Pat. 848,811, U.S. Pat. 2,715,136). However, these processes have serious disadvantages, e.g., chlorination is extremely exothermic and by no means easy to control. Violent explosions involving fatalities are not unknown in these reactions and working-up procedures. A further disadvantage is the formation of inhomogeneous sulfuryl chlorides or phosphoryl chlorides as byproducts, which makes purification of the product considerably more difficult and necessitates additional purification expense (U.S. Pats. 3,089,890 and 3,098,866). It is known to convert carboxylic acids or sulfonic acids into the corresponding acid chlorides with phosgene in the presence of a secondary amide such as dimethylformamide by exchanging chlorine for the OH group (Helv. Chim. Acta, 42, 1653, 1959; Angew. Chem., 72, 836, 1960; DAS 1,244,163). It is also known to convert esters of carboxylic acids into the acid chlorides with phosgene either without a catalyst (British Pat. 743,557) or with a complex-forming catalyst (French Pat. 1,080,261). Ester groups may thus be easily eliminated by phosgene or a phosgene complex. Such reactions are also known for esters of organic phosphoric acids (U.S. Pat. 3,167,574), in accordance with which O,O-diethylmethylphosphoric esters are attacked by phosgene with splitting of the ester bond even without a complex-forming catalyst, O-alkylmethylphosphoryl chlorides being formed. It is further known that potassium salts of O,O-diethyldithiophosphoric acids react with phosgene to give O,O-diethyl-S-chlorocarbonyldithiophosphates (no O,O-diethylthiophosphoryl chlorides being formed) (J. Chem. Soc., 3067–70, 1961); the production of O,O-diethylthiophosphoryl chlorides from potassium salts with chlorinating agents other than phosgene, e.g., elementary chlorine or agents donating chlorine such as sulfur dichloride, phosphorus pentachloride, phosphorus trichloride, sulfuryl chloride, etc., by eliminating the SH group or its salts is known (U.S. Pat. 2,692,839, British Pat. 656,303, U.S. Pat. 2,715,136, Japanese printed application 15 405/68). It is also known that mercaptans react with phosgene in the presence of catalytic amounts of a secondary amide such as dimethylformamide to give analogous products, in this case chlorothioformyl esters.

We have now found that O,O-disubstituted thionophosphoryl chlorides are obtained from O,O-disubstituted dithiophosphoric acids and phosgene when the O,O-disubstituted dithiophosphoric acids are reacted in the presence of a secondary amide.

It could not have been anticipated that O,O-disubstituted dithiophosphoric acids would react with phosgene in the presence of catalytic amounts of a secondary amide such as dimethylformamide even under mild reaction conditions to give unexpectedly high yields (up to 95% and above) of the corresponding O,O-disubstituted thiophosphoryl chlorides, the SH group of the O,O-disubstituted dithiophosphoric acids being replaced by a chlorine atom, without the ester groups in the molecule being attacked under the reaction conditions employed.

The process according to the invention for the production of O,O-disubstituted thionophosphoryl chlorides may be represented by the following equation:

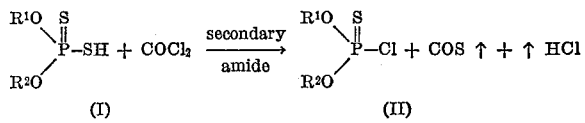

$R^1$ and $R^2$ denote alkyl preferably containing 1 to 6 carbon atoms, e.g., methyl, ethyl, n-propyl, isopropyl, and butyl, or cycloalkyl, e.g., cyclohexyl, or alkenyl, e.g., allyl; they may further denote substituted alkyl, such as haloalkyl, e.g., β-chloroethyl, or alkoxyalkyl, e.g., β-methoxyethyl, or alkylthioalkyl, e.g., methylthioethyl. The most important compounds having the Formula II are O,O-dimethylthionophosphoryl chloride, O,O-diethylthionophosphoryl chloride and O,O-dipropylthionophosphoryl chloride.

The reaction may be carried out in the presence or absence of a solvent or diluent. If a solvent is used the amount may vary considerably and is generally between 20 and 80%, with reference to O,O-disubstituted dithiophosphoric acid. Suitable solvents or diluents are all inert solvents, such as hydrocarbons, e.g., benzene, toluene, xylene, hexane, cyclohexane and ligroin. Halogenated hydrocarbons, e.g., chlorobenzene, and carbon tetrachloride, chloroform, 1,2-dichloroethane or the corresponding O,O-disubstituted thionophosphoryl chloride itself may also be used. The crude thionophosphoryl chloride obtained by the process of the invention may be purified by washing with water and/or distillation. The crude O,O-disubstituted dithiophosphoric acids obtained from phosphorus pentasulfide and the appropriate alcohols may be used direct as starting materials. However, as it is advisable to use an inert diluent when producing the O,O-disubstituted dithiophosphoric acids and as the crude product obtained is advantageously employed as starting material, separation of the crude acids from the solvent would mean an unnecessary additional step. In this case, the process of the invention is advantageously carried out in the presence of the solvent from the previous synthesis.

In one embodiment of the process of the invention phosphorus pentasulfide is suspended in an inert solvent, e.g., benzene and reacted in known manner with an alcohol, e.g., methanol. After the reaction, residual hydrogen sulfide is expelled from the reaction mixture with nitrogen, and a secondary amide, e.g., dimethylformamide, is added; catalytic amounts of as low as 0.1 to 10% and above, preferably however from 1 to 5%, with reference to O,O-disubstituted dithiophosphoric acid, have the desired result and make the process economically attractive. Phosgene is then introduced, and in the slightly exothermic reaction carbonyl sulfide and hydrogen chloride escape. The reaction is complete when the reaction temperature sinks. As some phosgene always escapes unreacted, somewhat more than the stoichiometric amount (an excess of 10 to 20% is normally sufficient) of phosgene is supplied, followed by brief sweeping with nitrogen. To remove small amounts of solid impurities, the solution may be filtered, swept with nitrogen and washed with water. The solution obtained in this manner is, even in the crude state, pure enough for most further reactions. If a product completely free from impurities is desired, the solution may subsequently be subjected to distillation.

Particularly high yields are obtained when the secondary amide is placed in a receiver with some solvent (generally 2 to 5 times the amount of secondary amide) and phosgene is fed in. Only after commencement of phosgene introduction is the appropriate O,O-disubstituted dithiophosphoric acid or a solution thereof metered in, and in such a manner that there is always a small excess of phosgene in the reaction mixture. To complete the reaction, it is advisable in most cases to heat, after the phosgene feed has been cut, briefly at elevated temperature or under reflux—most dissolved gases escape. Working up is carried out as previously described.

The reaction temperature is not restricted to a narrow range, but lies between −20° and +140° C., preferably between +10° and +110° C. There are, depending upon the type of the ester groups, optimum temperature ranges; in general, lower substituents provide better results at lower temperatures. With lower substituents, it is also advisable to use as small an excess of phosgene as possible.

Suitable secondary amides are compounds of the formula

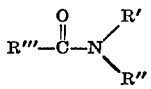

where R' and R''' each denote lower alkyl or R''' may denote hydrogen or aryl and R'' denotes lower alkyl. R'' and R''' together may also form a ring. Particularly suitable secondary amides are dimethylformamide, dimethylacetamide and N-methylpyrrolidone, which are commercially available.

As compared with prior art processes, the process of the invention has various advantages which are summarized below:

The reaction with phosgene proceeds under mild reaction conditions and is easy to control; there is therefore practically no danger of explosions. When chlorinating with elementary chlorine or agents donating chlorine, e.g., sulfuryl chloride, the reaction can only be kept under control with considerable external cooling (even this measure has not prevented accidents from happening), whereas the new process may be carried out without appreciable cooling, as the reaction is only weakly exothermic and part of the heat of reaction is removed by the escaping carbonyl sulfide and hydrogen chloride. Furthermore, in this process no strongly corrosive sulfur chlorides are formed which impede working up as they have to be removed; otherwise, violent decomposition could occur during distillation and the yield would be lowered. The byproducts of the process of the invention are gases (carbonyl sulfide, hydrogen chloride) and escape during the reaction; residues are easily purged with nitrogen. Whereas in known processes a viscous solid residue consisting mainly of sulfur remains after distillation of the crude products, only small amounts of easily removable distillation bottoms are obtained in the process of the invention. Furthermore, the secondary amide, in the form of its phosgene adduct, may be recovered in the new process as it is precipitated upon completion of the reaction and is accessible after decanting or filtering.

The execution of the process is shown by way of example below. It is pointed out here that the yields given below may be reasonably related only to the O,O-disubstituted dithiophosphoric acid actually present, as its concentration depends on the quality of the $P_2S_5$ used, which is often subject to considerable fluctuations. Some examples are referred to $P_2S_5$ merely to show the approximate relationship.

EXAMPLE 1

20 ml. of dimethylformamide (DMF) is dissolved in 100 ml. of dry benzene and approximately 20 g. of phosgene is introduced; the DMF-phosgene complex is precipitated. The phosgene feed is continued, and a solution of 372 g. (2 moles) of 96% O,O-diethyldithiophosphoric acid in 300 ml. of benzene is dripped in in such a manner that there is always a small phosgene excess in the reaction mixture. The reaction temperature is allowed to rise to 35° to 40° C. and is kept at this temperature by intermittent cooling with cold water. Not more than a total of 210 to 230 g. of phosgene is fed in. Upon completion of the reaction—detectable as a result of a drop in reaction temperature and termination of gas evolution—the precipitated DMF-phosgene complex is separated by decanting, the benzene solution is washed with 200 ml. of cold water, the washing water diluted 2 to 3 times and extraction is again carried out with 100 ml. of benzene. The extracts are combined and the benzene solution is dried over sodium sulfate or adherent water is removed as an azeotropic mixture upon removal of the solvent. 400 g. of a crude product is thus obtained which analyzes gas-chromatographically as follows:

| | Percent |
|---|---|
| O,O-diethylthiophosphoryl chloride (a yield of 95.3%, with reference to acid) | 86.2 |
| Benzene | 9 |
| Non-identified impurity (possibly O,O-diethylphosphoryl chloride) | 4.8 |

Subsequent vacuum distillation gives 332 g. (92.6% of theory with reference to acid) of pure O,O-diethylthiophosphoryl chloride (B.P. (0.2 mm. Hg): 40° to 42° C.).

EXAMPLE 2

100 g. of O,O-diethylthiophosphoryl chloride is placed as solvent in a receiver and 20 g. of DMF is added. Phosgene is fed in until above 10 to 20 g. thereof is in the solution. At this stage, 372 g. of 94.5% O,O-diethyldithiophosphoric acid is metered in, the reaction temperature being kept at 40° to 50° C. A total of 230 g. of phosgene is fed in. Upon completion of the reaction, the phosgene complex is precipitated and separated by decanting, and the crude product is washed with 275 ml. of cold water and dried over $Na_2SO_4$. After separation of the $Na_2SO_4$, the following yield is obtained: crude yields:

| | G. |
|---|---|
| O,O-diethylthiophosphoryl chloride | 455 |
| O,O-diethylthiophosphoryl chloride used as solvent | −100 |
| Crude yield, equivalent to 99.7%, with reference to titrated acid | 355 |

After vacuum distillation, there is obtained (B.P. (0.5 mm. Hg); 44° to 45° C.):

| | G. |
|---|---|
| Pure O,O-diethylthiophosphoryl chloride | 431 |
| O,O-diethylthiophosphoryl chloride used as solvent | −100 |
| O,O-diethylthiophosphoryl chloride (92.8% of theory, with reference to titrated acid) | 331 |

These remains a distillation residue of 15 g.

EXAMPLE 3

Over a period of approximately 1 hour and at 35° to 40° C., 250 g. (5.5 moles) of dry ethanol is dripped into a suspension of 222 g. (1 mole) of $P_2S_5$ in 300 ml. of absorbed benzene. The mixture is kept for 3 hours at 40° C. and for 1 hour at 70° C. Subsequently, 150 ml. of benzene, which contains the unreacted ethanol and is reused in the next batch, is distilled off. 20 ml. of DMF in 150 ml. of benzene is placed in a different reaction vessel and the procedure of Example 1 is adopted. There is obtained 374 g. of crude product which after vacuum distillation (B.P. (0.4 mm. Hg) =41° to 43° C.) gives a yield of 87.7%, with reference to $P_2S_5$, of pure O,O-diethylthiophosphoryl chloride. Similar results were obtained in a series of 5 experiments conducted as above: the yields were from 85 to 90% of theory, with reference to $P_2S_5$.

EXAMPLE 4

202.4 g. (4.4 moles) of absorbed ethanol is dripped into a suspension of 222 g. (1 mole) of $P_2S_5$ in 350 ml. of toluene. The mixture is stirred for 2 to 3 hours at 50° to 60° C. and for 1 hour at 80° C., by which time all has passed into solution. Residual $H_2S$ is expelled with nitrogen. 20 ml. of DMF is added and about 220 to 250 g. of phosgene is fed in; the temperature rises, without external cooling, to 60° to 70° C. When the reaction subsides, residual gases are expelled with nitrogen, the precipitated phosgene complex is separated by decanting, and the decantate is washed with 300 ml. of cold water containing 10% of NaCl and dried over $Na_2SO_4$. Vacuum distillation (B.P. at 0.2 mm. Hg=40° to 42° C.) gives 264 g. of O,O-diethylthiophosphoryl chloride, a yield of 71% of theory, with reference to $P_2S_5$.

A similar experiment using 96% distilled acid gave a yield of 288 g. (80.6% of theory, with reference to O,O-diethyldithiophosphoric acid).

EXAMPLE 5

At 25° to 35° C., 176 g. (5.5 moles) of methanol is dripped into a suspension of 222 g. (1 mole) of $P_2S_5$ in 350 ml. of dry methylene chloride. The mixture is stirred overnight at room temperature. After heating for 1 hour at 40° C., purging is briefly effected with nitrogen. 150 ml. is distilled off which consists of a mixture of methylene chloride and unreacted methanol. 5 ml. of DMF in 100 ml. of dry methylene chloride is placed in another reaction vessel and about 10 to 20 g. of phosgene is passed in. The crude acid solution described above, whose O,O-dimethyldithiophosphoric acid concentration (with reference to $P_2S_5$) is determined by titration as being 79%, is metered in in such a manner that there is always a small excess of phosgene in the reaction mixture. A total of 195 g. of phosgene is fed in. When the reaction is over, the mixture is heated under reflux for about 30 minutes, during which period dissolved gases escape. The mixture is then cooled to room temperature and washed with 200 ml. of cold water. The mixture is briefly dried over $Na_2SO_4$ and filtered, and first the solvent is distilled off and then, in vacuo, the crude product remaining: boiling point (13 mm. of Hg)=63° to 66° C.; yield 214 g. (84.3% of theory, with reference to acid).

EXAMPLE 6

Over a period of approximately 90 minutes and at 40° C., 176 g. (5.5 moles) of dry methanol is dripped into 222 g. (1 mole) of $P_2S_5$ in 333 ml. of benzene. The mixture is stirred overnight at room temperature and subsequently heated under reflux for 1 hour. Titration gives a concentration of 76.7% acid. 20 ml. of DMF is added to this crude acid solution and, at 50° to 60° C., about 300 g. of phosgene is fed in. The mixture is briefly heated to 70° C., cooled to 10° C., filtered and distilled. Boiling point (23 mm. Hg) =80° to 82° C.; yield: 143 g. (57% of theory, with reference to titrated acid).

EXAMPLE 7

At 40° C., 300 g. (5 moles) of dry n-propanol is dripped into a suspension of 222 g. (1 mole) of $P_2S_5$ in 400 ml. of benzene. The mixture is stirred overnight at room temperature and then heated for 1 hour at 60° C. The acid concentration is determined by titration as being 80.6%. 100 ml. of solvent+propanol excess is distilled off. 10 ml. of DMF in 100 ml. of benzene is then placed in a different reaction vessel and 15 g. of phosgene is fed in. The crude acid solution is then metered in in such a manner that there is always a small excess of phosgene in the reaction mixture and the temperature is constant at about 40° C. A further 193 g. of phosgene is introduced and the mixture is then stirred for 1 hour at 50° C., cooled to room temperature, and washed with 200 ml. of water. After dilution to twice its volume, this water is again extracted with 100 ml. of benzene, the extracts are combined and the benzene solutions are dried over $Na_2SO_4$ and distilled in vacuo. Boiling point (3.1 mm. Hg) =87° to 90° C.; yield: 343 g. (87.8% of theory, with reference to titrated acid).

Further O,O-disubstituted thionophosphoryl chloride may be prepared analogously. The following table gives an idea of the general applicability of the process.

TABLE

| Starting material | End product | B.P. in ° C. | Mm. Hg | $n_D^{25}$ | Yield in percent with reference to titrated acid |
|---|---|---|---|---|---|
| $(H_3CO)_2\overset{S}{\overset{\|}{P}}-SH$ | $(H_3CO)_2\overset{S}{\overset{\|}{P}}-Cl$ | 71 to 73 | 20 | 1.4825 | 85. |
| $(H_5C_2O)_2\overset{S}{\overset{\|}{P}}-SH$ | $(H_5C_2O)_2\overset{S}{\overset{\|}{P}}-Cl$ | 48 to 51 | 1 | 1.4689 | 93 to 95. |
| $(n-H_7C_3O)_2\overset{S}{\overset{\|}{P}}-SH$ | $(n-H_7C_3O)_2\overset{S}{\overset{\|}{P}}-Cl$ | 85 | 3 | 1.4692 | 87 to 88. |
| $(H_2C=HC-CH_2O)_2\overset{S}{\overset{\|}{P}}-SH$ | $(CH_2=CH-CH_2O)_2\overset{S}{\overset{\|}{P}}-Cl$ | 83 [1] | [1] 4 | 1.5050 | 75 to 76. |
| $(Cl-CH_2-CH_2O)_2\overset{S}{\overset{\|}{P}}-SH$ | $(Cl-CH_2-CH_2O)_2\overset{S}{\overset{\|}{P}}-Cl$ | Not able to be distilled without decomposition | | 1.5145 | 88. |
| $(H_3C-S-CH_2CH_2O)_2\overset{S}{\overset{\|}{P}}-SH$ | $(H_3C-S-CH_2CH_2O)_2\overset{S}{\overset{\|}{P}}-Cl$ | Not able to be distilled without decomposition | | 1.5478 | 61. |
| $(\langle H \rangle-O)_2\overset{S}{\overset{\|}{P}}-SH$ | $(\langle H \rangle-O)_2\overset{S}{\overset{\|}{P}}-Cl$ | Not able to be distilled without decomposition | | 1.5121 | 94. |

[1] Decomposes (distils with partial decomposition).

The last three O,O-disubstituted thiophosphoryl chlorides could not be distilled or analyzed by gas chromatography without decomposition occurring. The yields were determined by infrared spectroscopy.

We claim:
1. A process for the production of an O,O-disubstituted thionophosphoryl chloride by reaction of an O,O-disubstituted dithiophosphoric acid having the formula

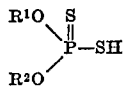

wherein $R^1$ and $R^2$ respectively denote alkyl of 1-6 carbon atoms, cyclohexyl, allyl, or said alkyl substituted by halogen, methoxy or methylthio with phosgene wherein the O,O-disubstituted dithiophosphoric acid is reacted with phosgene in the presence of N-methylpyrrolidone or a secondary amide having the formula

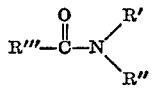

wherein R' denotes lower alkyl, R''' denotes lower alkyl or hydrogen and R'' denotes lower alkyl.

2. A process as claimed in claim 1 wherein the reaction is effected in the presence of a solvent or diluent.

3. A process as claimed in claim 1 wherein the crude thionophosphoryl chloride is purified by distillation and/or washing with water.

4. A process as claimed in claim 1 wherein the reaction of the O,O-disubstituted dithiophosphoric acid with phosgene is effected at a temperature of from —10° C. to +140° C.

5. A process as claimed in claim 1 wherein an impure O,O-disubstituted dithiophosphoric acid is used as the starting material.

6. A process as claimed in claim 1 wherein unreacted phosgene is removed from the reaction mixture after completion of the reaction.

7. A process as claimed in claim 1 wherein $R^1$ and $R^2$ denote alkyl of 1-6 carbon atoms.

8. A process as claimed in claim 7 wherein said amide is dimethylformamide, dimethylacetamide, or N-methylpyrrolidone.

9. A process as claimed in claim 1 wherein said amide is dimethylformamide, dimethylacetamide, or N-methylpyrrolidone.

10. A process as claimed in claim 9 wherein $R^1$ and $R^2$ denote methyl, ethyl or propyl.

11. A process as claimed in claim 1 wherein the reaction of the O,O-disubstituted dithiophosphoric acid with phosgene is effected at a temperature from 10° to 110° C.

References Cited
UNITED STATES PATENTS 3,167,574   1/1965   Brown et al. _____ 260—986

ANTON H. SUTTO, Primary Examiner

U.S. Cl. X.R.

260—951, 948, 960

UNITED STATES PATENT OFFICE
CERTIFICATE OF CORRECTION

Patent No. 3,781,389         Dated December 25, 1973

Inventor(s) Peter Beutel and Karl-Heinz Koenig

It is certified that error appears in the above-identified patent and that said Letters Patent are hereby corrected as shown below:

Column 3, lines 35-36, "or R''' may denote hydrogen" should be deleted and inserted behind "alkyl" line 36.

Signed and sealed this 29th day of October 1974.

(SEAL)
Attest:

McCOY M. GIBSON JR.
Attesting Officer

C. MARSHALL DANN
Commissioner of Patents